United States Patent
Maggi et al.

(10) Patent No.: US 11,778,565 B2
(45) Date of Patent: Oct. 3, 2023

(54) DETERMINING OPEN LOOP POWER CONTROL PARAMETERS

(71) Applicant: Nokia Solutions and Networks Oy, Espoo (FI)

(72) Inventors: Lorenzo Maggi, Paris (FR); Alvaro Valcarce Rial, Saint-Cloud (FR); Jakob Hoydis, Paris (FR); Richa Gupta, Bangalore (IN); Suresh Kalyanasundaram, Bangalore (IN); Veronique Capdevielle, Magny les Hameaux (FR)

(73) Assignee: Nokia Solutions and Networks Oy, Espoo (FI)

( * ) Notice: Subject to any disclaimer, the term of this patent is extended or adjusted under 35 U.S.C. 154(b) by 36 days.

(21) Appl. No.: 17/545,306

(22) Filed: Dec. 8, 2021

(65) Prior Publication Data
US 2022/0191798 A1 Jun. 16, 2022

(30) Foreign Application Priority Data
Dec. 10, 2020 (FI) ...................................... 20206278

(51) Int. Cl.
*H04W 52/10* (2009.01)
*H04W 52/22* (2009.01)

(52) U.S. Cl.
CPC ......... *H04W 52/10* (2013.01); *H04W 52/225* (2013.01)

(58) Field of Classification Search
CPC ............................ H04W 52/10; H04W 52/225
See application file for complete search history.

(56) References Cited

U.S. PATENT DOCUMENTS

| 6,633,857 | B1* | 10/2003 | Tipping | ................. | G06N 3/047 706/20 |
| 6,879,944 | B1* | 4/2005 | Tipping | .............. | G06F 18/2411 703/2 |
| 7,421,380 | B2* | 9/2008 | Thiesson | ................. | G06F 18/00 702/182 |
| 9,693,280 | B2* | 6/2017 | Ratasuk | ................ | H04W 24/10 |

(Continued)

FOREIGN PATENT DOCUMENTS

| CA | 3028386 A1 | 6/2019 |
| EP | 2863688 A1 * | 4/2015 ......... H04W 52/146 |

(Continued)

OTHER PUBLICATIONS

"3rd Generation Partnership Project; Technical Specification Group Radio Access Network; NR; Physical layer procedures for control (Release 15)", 3GPP TS 38.213, V15.9.0, Mar. 2020, pp. 1-109.

(Continued)

*Primary Examiner* — Hai V Nguyen
(74) *Attorney, Agent, or Firm* — Nokia Technologies Oy (57) ABSTRACT

Disclosed is a method for determining open loop power control parameters. A first set of key performance indicators associated with a first set of open loop power control parameters is obtained from one or more first base stations. A statistical model is determined based at least partly on the first set of key performance indicators and the first set of open loop power control parameters. A second set of open loop power control parameters is determined based at least partly on the statistical model.

13 Claims, 7 Drawing Sheets

(56) References Cited

U.S. PATENT DOCUMENTS

| | | | | |
|---|---|---|---|---|
| 9,820,296 | B2* | 11/2017 | Madan | H04W 72/21 |
| 9,961,487 | B1* | 5/2018 | Miao | H04W 4/029 |
| 10,091,697 | B1* | 10/2018 | Uplenchwar | H04W 24/02 |
| 10,282,673 | B2* | 5/2019 | Wang | G06N 20/00 |
| 10,674,518 | B2* | 6/2020 | Rajendran | H04W 72/541 |
| 10,832,174 | B1* | 11/2020 | Chen | G06N 5/01 |
| 11,039,398 | B2* | 6/2021 | Vivanco | H04W 52/241 |
| 11,487,273 | B1* | 11/2022 | Zhao | G05B 19/41885 |
| 11,544,634 | B2* | 1/2023 | Kamulete | G06N 20/20 |
| 2009/0149134 | A1* | 6/2009 | Gunnarsson | H04W 52/243 |
| | | | | 455/63.1 |
| 2011/0136448 | A1* | 6/2011 | Yang | H04W 52/04 |
| | | | | 455/114.2 |
| 2012/0307745 | A1* | 12/2012 | Panchal | H04W 52/242 |
| | | | | 370/329 |
| 2015/0223135 | A1* | 8/2015 | Ratasuk | H04W 36/20 |
| | | | | 455/436 |
| 2016/0077190 | A1* | 3/2016 | Julian | G01S 5/0278 |
| | | | | 342/451 |
| 2016/0077191 | A1* | 3/2016 | Julian | G01S 5/0036 |
| | | | | 342/451 |
| 2016/0150488 | A1* | 5/2016 | Luo | H04W 52/265 |
| | | | | 370/328 |
| 2016/0309356 | A1* | 10/2016 | Madan | H04W 28/0236 |
| 2017/0026914 | A1* | 1/2017 | Madan | H04W 52/242 |
| 2017/0026915 | A1* | 1/2017 | Madan | H04W 52/244 |
| 2017/0164206 | A1* | 6/2017 | Madan | H04W 28/04 |
| 2017/0289923 | A1* | 10/2017 | Madan | H04B 17/309 |
| 2017/0295515 | A1* | 10/2017 | Madan | H04W 28/04 |
| 2018/0077580 | A1* | 3/2018 | Madan | H04W 28/04 |
| 2018/0332558 | A1* | 11/2018 | Chan | H04W 24/02 |
| 2018/0349158 | A1* | 12/2018 | Swersky | G06N 20/00 |
| 2019/0026648 | A1* | 1/2019 | Da | G06N 7/01 |
| 2019/0080261 | A1* | 3/2019 | Wang | G06N 20/10 |
| 2019/0200363 | A1* | 6/2019 | Rajendran | H04W 52/16 |
| 2020/0175404 | A1* | 6/2020 | Selvanayagam | G06N 20/00 |
| 2020/0372327 | A1* | 11/2020 | Qiu | G06N 7/01 |
| 2020/0383059 | A1* | 12/2020 | Vivanco | H04W 52/386 |
| 2021/0066141 | A1* | 3/2021 | Phan | G06N 3/045 |
| 2021/0084536 | A1* | 3/2021 | Chou | H04W 36/22 |
| 2021/0195581 | A1* | 6/2021 | Singh | H04W 72/21 |
| 2021/0243592 | A1* | 8/2021 | Chou | H04W 24/02 |
| 2021/0274445 | A1* | 9/2021 | Vivanco | H04W 52/10 |
| 2022/0077910 | A1* | 3/2022 | Wu | H04B 7/0626 |
| 2022/0188635 | A1* | 6/2022 | Qiu | G06N 7/01 |
| 2022/0295497 | A1* | 9/2022 | Rajendran | H04W 52/50 |
| 2022/0345863 | A1* | 10/2022 | Mueck | H04W 4/50 |
| 2022/0366284 | A1* | 11/2022 | Adam | G06N 20/00 |
| 2022/0382263 | A1* | 12/2022 | Zhao | G06Q 10/0637 |

FOREIGN PATENT DOCUMENTS

| | | | | |
|---|---|---|---|---|
| EP | 2863688 | A1 | 4/2015 | |
| EP | 3010290 | A1 | 4/2016 | |
| EP | 3125618 | A1 * | 2/2017 | H04B 17/309 |
| EP | 3125618 | A1 | 2/2017 | |
| EP | 3192302 | B1 * | 12/2018 | H04W 24/02 |
| EP | 3192302 | B1 | 12/2018 | |
| WO | 2016/039674 | A1 | 3/2016 | |
| WO | WO-2021105313 | A1 * | 6/2021 | G06N 20/00 |
| WO | WO-2022125617 | A1 * | 6/2022 | G06N 3/0454 |

OTHER PUBLICATIONS

Malik et al., "Investigation of Open-Loop Transmit Power Control Parameters for Homogeneous and Heterogeneous Small-Cell Uplinks", Electronics and Telecommunications Research Institute, vol. 40, No. 1, 2018, pp. 51-60.

Rasmussen et al., "Gaussian processes for machine learning", The MIT Press, 2006, 266 pages.

Theodoridis, "Machine learning: A Bayesian and optimization perspective", Academic Press, 2015, 24 pages.

Fletcher, "Practical methods of optimization", Wiley Publication, Second Edition, 1987, 14 pages.

Bottou, "Online Algorithms and Stochastic Approximations", Online Learning and Neural Networks, 1998, pp. 1-35.

Bergstra et al., "Algorithms for hyper-parameter optimization", Advances in Neural Information Processing Systems (NIPS), 2011, pp. 1-9.

Audet et al., "Derivative-free and blackbox optimization", Springer Series in Operations Research and Financial Engineering, 2017, 307 pages.

Shah et al., "Student-t processes as alternatives to Gaussian processes", Proceedings of Machine Learning Research, 2014, pp. 877-885.

Office action received for corresponding Finnish Patent Application No. 20206278, dated Mar. 10, 2021, 11 pages.

"3rd Generation Partnership Project; Technical Specification Group Radio Access Network; NR; Physical layer procedures for control (Release 16)", 3GPP TS 38.213, V16.3.0, Sep. 2020, pp. 1-179.

Dreifuerst et al., "Optimizing Coverage and Capacity in Cellular Networks using Machine Learning", arXiv, Oct. 22, 2020, 5 pages.

Maggi et al., "Bayesian Optimization for Radio Resource Management: Open Loop Power Control", arXiv, Dec. 15, 2020, pp. 1-13.

"Uplink Power Control Performance in UTRAN LTE Networks", Müllner R. et al., in Multi-Carrier Systems & Solutions 2009, pp. 175-184.

Communication of Acceptance received for corresponding Finnish Patent Application No. 20206278, dated Nov. 2, 2021, 8 pages.

Extended European Search Report received for corresponding European Patent Application No. 21210440.0, dated May 10, 2022, 8 pages.

* cited by examiner

DETERMINING OPEN LOOP POWER CONTROL PARAMETERS

FIELD

The following exemplary embodiments relate to wireless communication.

BACKGROUND

As resources are limited, it is desirable to optimize the usage of network resources. Uplink power control may be used to control the transmit power of terminal devices in a cellular communication network in order to enable better usage of resources and enhanced user experience to the users of the terminal devices.

SUMMARY

The scope of protection sought for various exemplary embodiments is set out by the independent claims. The exemplary embodiments and features, if any, described in this specification that do not fall under the scope of the independent claims are to be interpreted as examples useful for understanding various exemplary embodiments.

According to an aspect, there is provided an apparatus comprising at least one processor, and at least one memory including computer program code, wherein the at least one memory and the computer program code are configured, with the at least one processor, to cause the apparatus to: obtain, from one or more first base stations, a first set of key performance indicators associated with a first set of open loop power control parameters; determine a statistical model based at least partly on the first set of key performance indicators and the first set of open loop power control parameters; and determine a second set of open loop power control parameters based at least partly on the statistical model.

According to another aspect, there is provided an apparatus comprising means for: obtaining, from one or more first base stations, a first set of key performance indicators associated with a first set of open loop power control parameters; determining a statistical model based at least partly on the first set of key performance indicators and the first set of open loop power control parameters; and determining a second set of open loop power control parameters based at least partly on the statistical model.

According to another aspect, there is provided a method comprising obtaining, from one or more first base stations, a first set of key performance indicators associated with a first set of open loop power control parameters; determining a statistical model based at least partly on the first set of key performance indicators and the first set of open loop power control parameters; and determining a second set of open loop power control parameters based at least partly on the statistical model.

According to another aspect, there is provided a computer program comprising instructions for causing an apparatus to perform at least the following: obtain, from one or more first base stations, a first set of key performance indicators associated with a first set of open loop power control parameters; determine a statistical model based at least partly on the first set of key performance indicators and the first set of open loop power control parameters; and determine a second set of open loop power control parameters based at least partly on the statistical model.

According to another aspect, there is provided a computer readable medium comprising program instructions for causing an apparatus to perform at least the following: obtain, from one or more first base stations, a first set of key performance indicators associated with a first set of open loop power control parameters; determine a statistical model based at least partly on the first set of key performance indicators and the first set of open loop power control parameters; and determine a second set of open loop power control parameters based at least partly on the statistical model.

According to another aspect, there is provided a non-transitory computer readable medium comprising program instructions for causing an apparatus to perform at least the following: obtain, from one or more first base stations, a first set of key performance indicators associated with a first set of open loop power control parameters; determine a statistical model based at least partly on the first set of key performance indicators and the first set of open loop power control parameters; and determine a second set of open loop power control parameters based at least partly on the statistical model.

According to another aspect, there is provided a system comprising at least a first apparatus and one or more base stations. The one or more base stations are configured to: collect a first set of key performance indicators associated with a first set of open loop power control parameters; and transmit the first set of key performance indicators to the first apparatus. The first apparatus is configured to: receive the first set of key performance indicators from the one or more base stations; determine a statistical model based at least partly on the first set of key performance indicators and the first set of open loop power control parameters; determine a second set of open loop power control parameters based at least partly on the statistical model; and transmit the second set of open loop power control parameters to the one or more base stations. The one or more base stations are further configured to: receive the second set of open loop power control parameters from the first apparatus; and apply the second set of open loop power control parameters.

According to another aspect, there is provided a system comprising at least a first apparatus and one or more base stations. The one or more base stations comprise means for: collecting a first set of key performance indicators associated with a first set of open loop power control parameters; and transmitting the first set of key performance indicators to the first apparatus. The first apparatus comprises means for: receiving the first set of key performance indicators from the one or more base stations; determining a statistical model based at least partly on the first set of key performance indicators and the first set of open loop power control parameters; determining a second set of open loop power control parameters based at least partly on the statistical model; and transmitting the second set of open loop power control parameters to the one or more base stations. The one or more base stations further comprise means for: receiving the second set of open loop power control parameters from the first apparatus; and applying the second set of open loop power control parameters.

BRIEF DESCRIPTION OF THE DRAWINGS

In the following, various exemplary embodiments will be described in greater detail with reference to the accompanying drawings, in which.

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplary embodiments will be described using, as an example of an access architecture to which the exemplary embodiments may be applied, a radio access architecture based on long term evolution advanced (LTE Advanced, LTE-A) or new radio (NR, 5G) without restricting the exemplary embodiments to such an architecture, however. It is obvious for a person skilled in the art that the exemplary embodiments may also be applied to other kinds of communications networks having suitable means by adjusting parameters and procedures appropriately.

Figure 1:
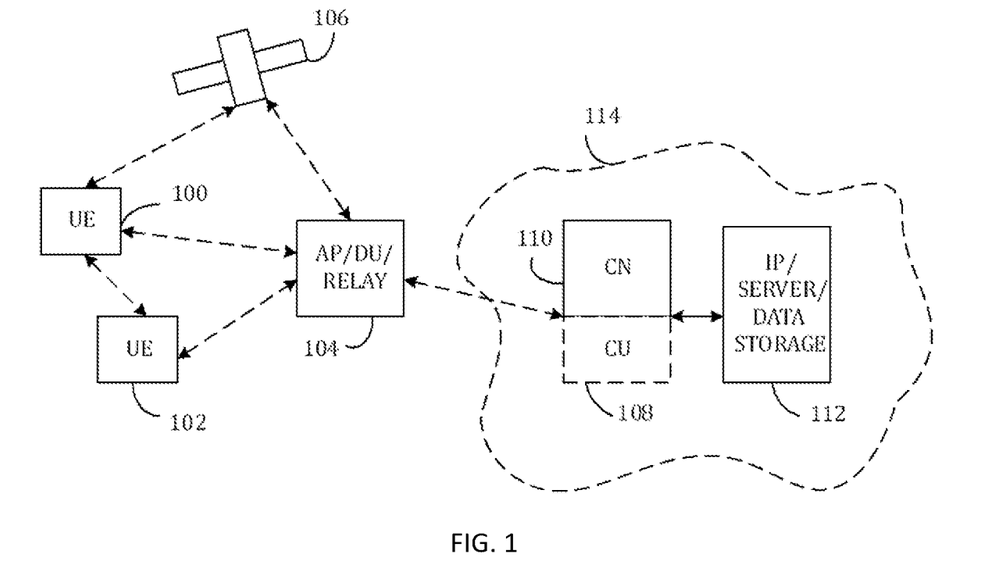
FIG. 1 illustrates an exemplary embodiment of a cellular communication network.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The exemplary embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB may be called uplink or reverse link and the physical link from the (e/g)NodeB to the user device may be called downlink or forward link. It should be appreciated that (e/g)NodeBs or their functionalities may be implemented by using any node, host, server or access point etc. entity suitable for such a usage.

A communication system may comprise more than one (e/g)NodeB, in which case the (e/g)NodeBs may also be configured to communicate with one another over links, wired or wireless, designed for the purpose. These links may be used for signaling purposes. The (e/g)NodeB may be a computing device configured to control the radio resources of communication system it is coupled to. The NodeB may also be referred to as a base station, an access point or any other type of interfacing device including a relay station capable of operating in a wireless environment. The (e/g)NodeB may include or be coupled to transceivers. From the transceivers of the (e/g)NodeB, a connection may be provided to an antenna unit that establishes bi-directional radio links to user devices. The antenna unit may comprise a plurality of antennas or antenna elements. The (e/g)NodeB may further be connected to core network 110 (CN or next generation core NGC). Depending on the system, the counterpart on the CN side may be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node may be a layer 3 relay (self-backhauling relay) towards the base station.

The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation may be carried out in the cloud. The user device (or in some exemplary embodiments a layer 3 relay node) may be configured to perform one or more of user equipment functionalities. The user device may also be called a subscriber unit, mobile station, remote terminal, access terminal, user terminal, terminal device, or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G may enable using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may be expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave, below 6 GHz-cmWave-mmWave). One of the concepts considered to be used in 5G networks may be network slicing in which multiple independent and dedicated virtual sub-networks (network instances) may be created within the same infrastructure to run services that have different requirements on latency, reliability, throughput and mobility.

The current architecture in LTE networks may be fully distributed in the radio and fully centralized in the core network. The low latency applications and services in 5G may require to bring the content close to the radio which leads to local break out and multi-access edge computing (MEC). 5G may enable analytics and knowledge generation to occur at the source of the data. This approach may require leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It may also be possible that node operations will be distributed among a plurality of servers, nodes or hosts. Application of cloudRAN architecture may enable RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements that may be used may be Big Data and all-IP, which may change the way networks are being constructed and managed. 5G (or new radio, NR) networks may be designed to support multiple hierarchies, where MEC servers may be placed between the core and the base station or nodeB (gNB). It should be appreciated that MEC may be applied in 4G networks as well.

5G may also utilize satellite communication to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may also comprise other apparatuses, such as physical layer relay nodes or other network elements, etc. At least one of the (e/g)NodeBs or may be a Home(e/g)nodeB. Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. In multilayer networks, one access node may provide one kind of a cell or cells, and thus a plurality of (e/g)NodeBs may be required to provide such a network structure.

For fulfilling the need for improving the deployment and performance of communication systems, the concept of "plug-and-play" (e/g)NodeBs may be introduced. A network which may be able to use "plug-and-play" (e/g)Node Bs, may include, in addition to Home (e/g)NodeBs (H(e/g) nodeBs), a home node B gateway, or HNB-GW (not shown in FIG. 1). A HNB Gateway (HNB-GW), which may be installed within an operator's network, may aggregate traffic from a large number of HNBs back to a core network.

Figure 2:
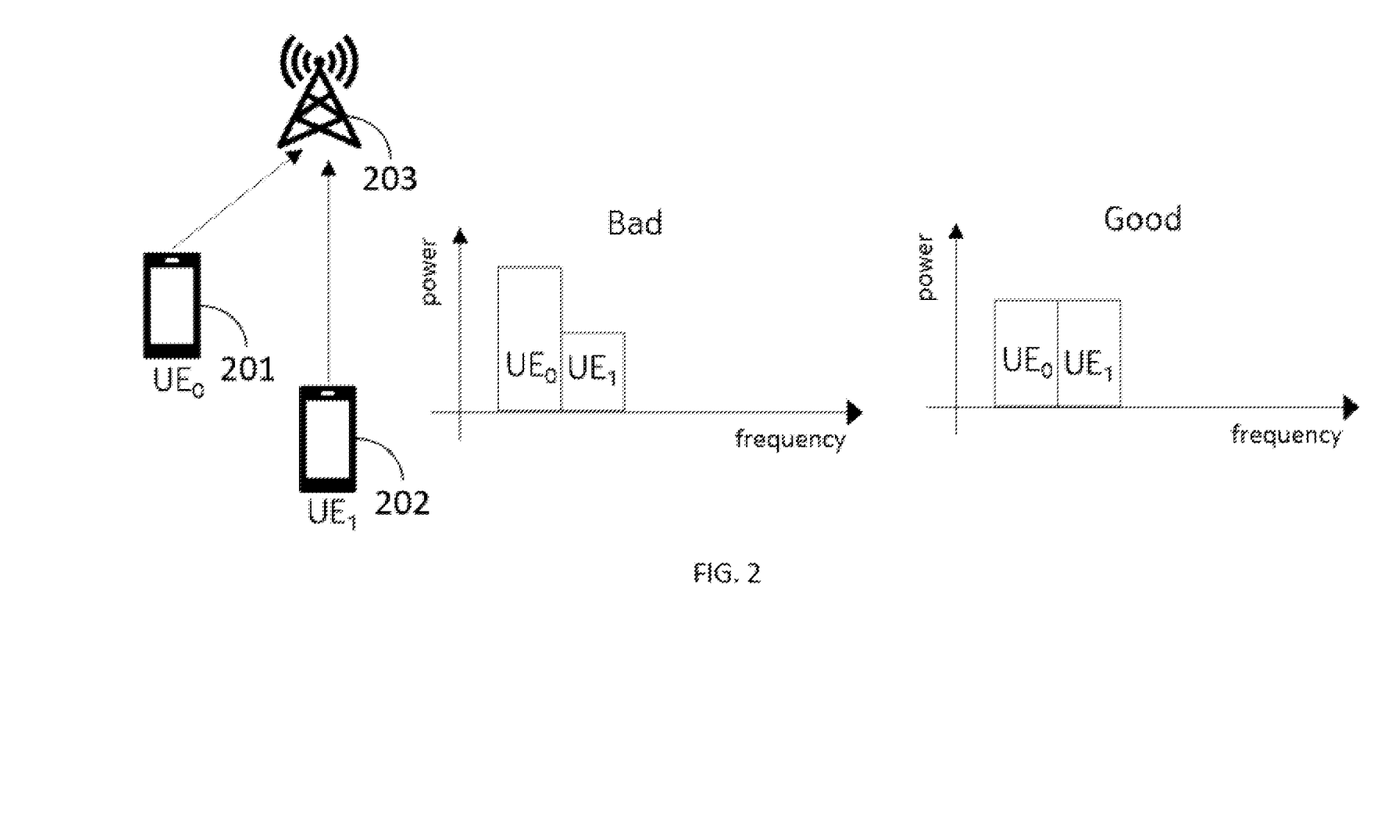
FIG. 2 illustrates an example of uplink received powers in an orthogonal frequency-division multiple access cellular network.

FIG. 2 illustrates an example of uplink received powers in an orthogonal frequency-division multiple access, OFDMA, cellular network. Uplink power control may be used to control the transmit power of terminal devices 201, 202 in a cellular network. In LTE and 5G NR networks, it may be beneficial if transmissions of different terminal devices 201, 202 within a cell multiplexed in a multi-user MIMO, MU-MIMO, fashion reach the base station 203 with the substantially same approximate power.

In addition, regarding uplink performance, power control settings may be used to control the average cell spectral efficiency and fairness of the user throughput across the users in the network. For users who are closer to the cell edge, using the substantially same power spectral density may cause more interference to neighbour cells when compared to a terminal device in the cell center, for example. Therefore, a fractional power control technique may be used, wherein the path loss compensation may be a fraction of the path loss experienced by the terminal device.

In NR, a terminal device may determine the physical uplink shared channel (PUSCH) transmission power (measured for example in dBm) in a PUSCH transmission occasion for example as follows:

$$P_{PUSCH} = \min\{P_{CMAX}, P_{O\_NOMINAL\_PUSCH} + 10 \log_{10}(M_{RB}) + \alpha PL + f\}$$

where $P_{CMAX}$ is the configured maximum transmit power of a terminal device, $P_{O\_NOMINAL\_PUSCH}$ is the nominal received power spectral density per physical resource block (PRB) if there is full path loss compensation, $\alpha$ is the fractional power control compensation parameter, PL is the downlink path loss estimated by the terminal device, f is the closed loop power control correction amount, and $M_{RB}$ is the number of PRBs allocated to the terminal device.

On the one hand, terminal devices transmitting with a power that is higher than what is needed may experience battery drain and cause unnecessary inter-cell interference to the uplink of nearby cells. On the other hand, terminal devices using a too low transmit power may have a poor quality of experience and/or connectivity losses. Therefore, proper control of the transmit powers of the uplink data channels may be beneficial to enable proper functioning of the network.

Open loop power control (OLPC) in the uplink of LTE and 5G NR cells refers to the selection of slow-changing power control parameters that the terminal device may use to autonomously select its own transmit power. The parameters that control this behaviour may be denoted as $P_{O\_NOMINAL\_PUSCH}$ and $\alpha$. $P_{O\_NOMINAL\_PUSCH}$ defines the received power per PRB expected at the base station, and a defines the path loss compensation factor. These are cell-specific parameters, and their selection defines how much uplink interference a given cell causes to its neighbour cells, as well as how much transmit power its terminal devices shall use.

Brute force approaches for selecting the cell-specific OLPC parameters may not be scalable due to the combinatorial nature of the problem. In fact, there may be 8 possible standard values for $\alpha$, 114 possible values for $P_{O\_NOMINAL\_PUSCH}$) and hence a total of N=8·114=912 possible OLPC configurations for a given cell in a network. In a network with C cells, there may be $N^C$ possible OLPC network configurations. As an example, there may be nearly 760 million combinations even for a small network with 3 cells.

Analytical models of the dependence between network key performance indicators (KPIs) and OLPC parameters may not be practical either, because they may depend on the path losses between terminal devices and neighbour cells, which may be geographically biased. Moreover, analytical approaches may need to be adjusted when deployed, due to mismatches between the theoretical model and the actual network functioning. Therefore, analytical approaches may suffer from slow online convergence.

Stochastic gradient descent (SGD) algorithms may also offer a framework where, by sequentially deploying new parameter configurations and measuring the associated network-wide KPI, a local optimum parameter choice may eventually be found. This approach may be used for offline scenarios, where the samples of the function to be optimized may be arbitrarily bad before convergence is attained, which may also be known as a cold-start problem. However, SGD techniques may not be suitable for online scenarios, where it may be harmful to deploy bad configuration parameters in the network just for the sake of exploration. Thus, it is desirable to provide a different approach for automatically adjusting OLPC parameters.

Some exemplary embodiments provide a self-organizing network (SON) architecture and a method for optimizing the OLPC parameters of one or more cells in a mobile network. Furthermore, some exemplary embodiments may be used to determine the combination of OLPC parameters that yield the maximum network KPI(s). A SON may be defined as a system for automatic configuration, optimization and healing of a radio access network.

In an exemplary embodiment, a procedure for optimizing cell-specific OLPC parameters may comprise of: 1) selecting and deploying new parameter configurations sequentially, 2) converging to a good parameter configuration in just a few steps, while avoiding temporary performance loss due to bad exploration choices, 3) adapting to evolving network conditions for example in terms of cell load, and proportion of terminal devices at the cell edge, and 4) reusing the gained knowledge across multiple networks in order to avoid starting the optimization from scratch when different conditions arise.

Figure 3:
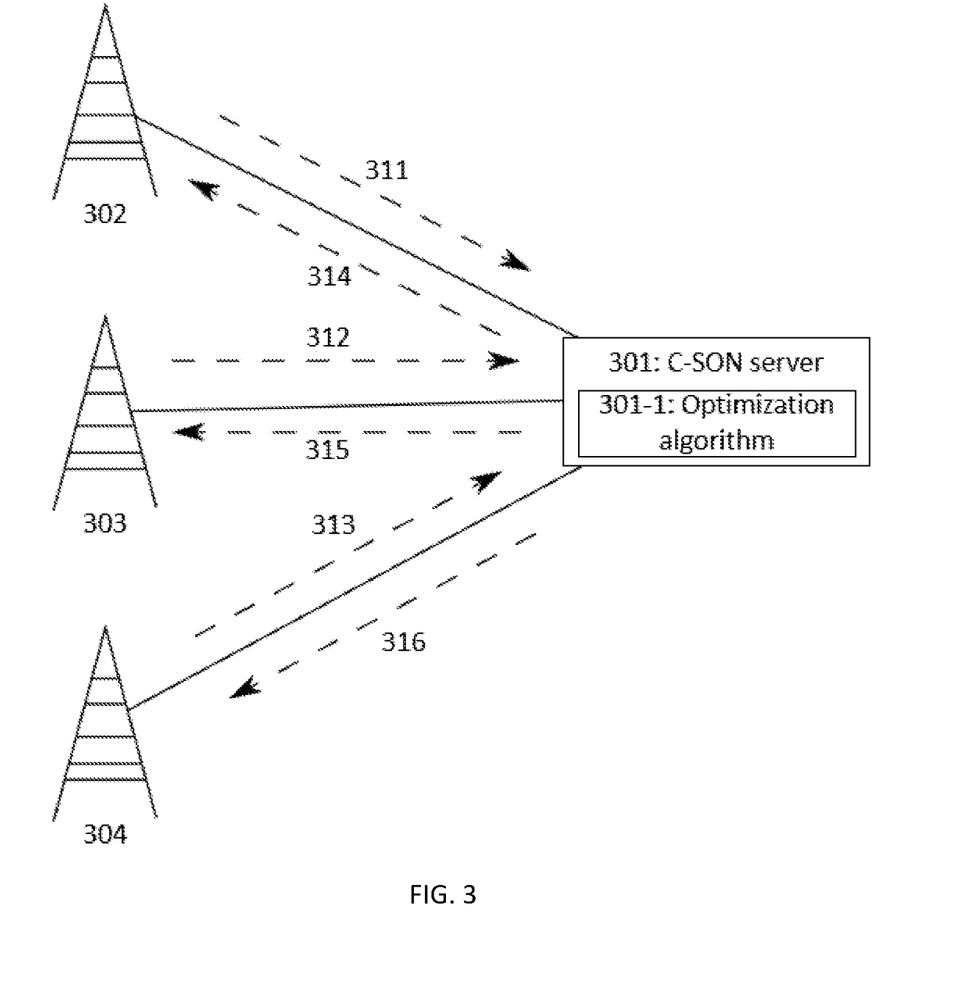
FIG. 3 illustrates a simplified architecture of a system comprising a centralized self-organizing network server according to an exemplary embodiment.

FIG. 3 illustrates a simplified architecture of a system comprising a centralized self-organizing network (C-SON) server 301, according to an exemplary embodiment. Optionally, the C-SON server 301 may collect historical information on the quality of OLPC parameter configurations on different network deployments and/or different cell clusters, and create an OLPC-parameter-to-KPI tabular mapping based on the historical information. The C-SON server 301 collects 311, 312, 313 KPIs from one or more base stations 302, 303, 304 in the network. Optionally, the C-SON server 301 may also collect contextual information from the one or more base stations 302, 303, 304, such as cell load and/or the percentage of terminal devices at the cell edge. The C-SON server 301 determines a statistical model of the network-wide KPI function to be optimized with respect to the cell-specific OLPC. An optimization algorithm 301-1 comprised in the C-SON server 301 then determines the next OLPC parameter configuration by solving an optimization problem that takes the statistical model and optionally also the collected contextual information as input. The determined cell-specific OLPC parameter configuration to be used next is then transmitted 314, 315, 316 to the one or more base stations 302, 303, 304.

In some exemplary embodiments, the above-described functionalities, such as collecting the KPIs and determining the next OLPC parameter configuration, may be hosted on different network entities.

Figure 4:
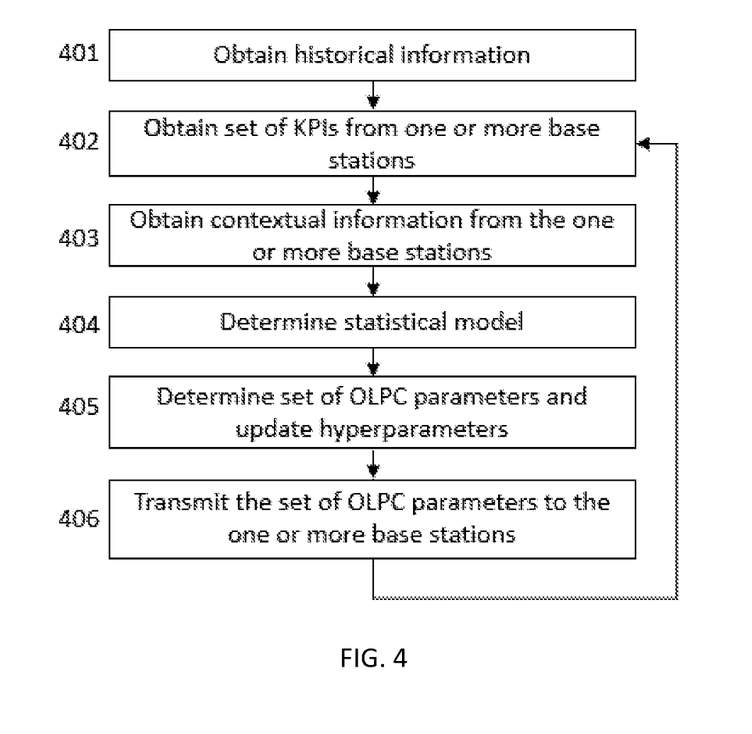
FIGS. 4-6 illustrate flow charts according to some exemplary embodiments.

FIG. 4 illustrates a flow chart according to an exemplary embodiment. The procedures illustrated in FIG. 4 may be performed by an apparatus such as a C-SON server, for example.

Referring to FIG. 4, historical information on the quality of OLPC parameter configurations for different cell clusters is obtained 401. In order to optimize the OLPC parameters for one or more base stations associated with a first cell cluster, the C-SON server may collect the historical information on the OLPC-parameter-to-KPI mapping from one or more base stations related to a different cell cluster, for example a second cell cluster. In other words, the historical information indicates a relationship between the OLPC parameters and the KPIs associated with the one or more base stations of the second cell cluster. This allows the C-SON server to form a prior belief over the OLPC-parameter-to-KPI function associated with the first cell cluster. In this case, m(x) is the network-wide KPI that is expected when OLPC parameters x are deployed in the first cell cluster. The prior belief may be defined as an initial guess of the expected KPI associated with OLPC parameter choices, for which no measurement data in the cluster of interest is available. Such a guess may be formed by simply evaluating or, alternatively, interpolating historical data on different parameter choices.

A set of KPIs is obtained 402, or received, from one or more base stations associated with the first cell cluster. The set of KPIs may comprise, for example, the average achieved throughput over a time window, the average signal-to-interference-plus-noise ratio (SINR) across a plurality of terminal devices (measured for example in dB), and/or the number of lost packets. The KPIs may be collected over an arbitrary duration. As a non-limiting example, the KPIs may be collected over a 1-day or 1-week period.

Contextual information is obtained 403, or received, from the one or more base stations associated with the first cell cluster. The contextual information may comprise, for example, radio cell load in downlink and/or uplink, hardware cell load in downlink and/or uplink, backhaul cell load in downlink and/or uplink, a percentage (i.e. proportion) of terminal devices at the cell edge, satellite image(s), two-dimensional (2D) map(s), three-dimensional (3D) building model(s), a spatio-temporal distribution of terminal devices, weather information such as temperature and precipitation rate, date(s), timestamp(s), and/or a random access channel (RACH) failure rate.

A statistical model of the network-wide KPI function to be optimized is determined 404 based on the obtained KPIs and/or the historical information. For example, the network-wide KPI function may be defined as the average SINR per PRB to be maximized by adjusting the OLPC parameters. This may be achieved, for example, via the Gaussian process theoretical framework. However, other machine learning models, such as the Parzen estimator approach, deep belief networks, or Student-t processes, may alternatively be used instead.

F(x) denotes the network-wide KPI to be maximized as a function of the cell-specific OLPC parameter vector x. x is the concatenation of $[P_0(c_1), \alpha(c_1), \ldots, P_0(c_N), \alpha(c_N)]$, where $P_0(c_i), \alpha(c_i)$ are the OLPC parameters associated to cell cluster $c_i$, under the assumption that the cells belonging to a specific cluster adopt the substantially same OLPC parameters. In the Gaussian process context, it may be assumed that, for any set of parameters $x_1, \ldots, x_n$, $[F(x_1), \ldots, F(x_n)]$ are jointly Gaussian. The underlying Gaussian distribution may be defined by: 1) the mean of F(x), using the prior m(x) obtained in block 401 or m(x)=0 in the absence of such, as well as 2) the covariance between F(x),F(x'), which may be determined by a parametrizable kernel function K(x,x'). For instance, $$K(x, x') = Ae^{\frac{(x-x')^2}{B}},$$

where A, B are adjustable parameters. This kernel is called a radial basis function (RBF). Points x, x' that are close to each other (x≈x') may also provide a similar KPI (F(x)≈F(x')).

As the C-SON server has collected the KPI $F(\bar{x}_1), \ldots, F(\bar{x}_k)$ corresponding to the OLPC configuration parameters $\bar{x}_1, \ldots, \bar{x}_k$, in block 402, then the Gaussian processes may be used to infer the value of F at configuration parameters x that have not been previously deployed in the network. In other words, via Gaussian processes the value F(x) may be inferred via a Gaussian distribution with mean:

$$\mu(x) = m(x) + K(x,\bar{x})C^{-1}(F(\bar{x}) - m(\bar{x}))$$

and variance:

$$\sigma^2(x) = \sigma_n^2 + K(x,x) - K(x,\bar{x})C^{-1}K(x,\bar{x})^T$$

where $K(x,\bar{x}) = [K(x,\bar{x}_i)]_i$, $m(\bar{x}) = [m(\bar{x}_i)]_i$, $C = [K(\bar{x}_i,\bar{x}_j)]_{i,j}$ is the covariance matrix of the deployed parameters, and $\sigma_n^2$ is the estimated variance of the (noisy) function F.

A set of new OLPC configuration parameters are determined 405 based on the statistical model and/or the obtained contextual information, and hyperparameters are updated. Based on the inferred mean $\mu(x)$ and variance $\sigma^2(x)$ that Gaussian processes offer at any OLPC parameter configuration x that has not been previously deployed, the C-SON server determines which configuration to deploy next via Bayesian optimization (BO). This can be obtained by maximizing the acquisition function a(x) that is a function of $\mu(x)$, $\sigma^2(x)$ and that may express the following: 1) the improvement to the best KPI, denoted as F*, found so far that is expected by deploying the OLPC parameters x in the network, namely $a(x) = E[F(x) - F^*]^+$, 2) the probability of improvement, namely $a(x) = Pr(F(x) > F^*)$, and 3) the upper confidence interval, namely $a(x) = m(x) + \sigma(x)$.

In the hyperparameter update, the C-SON server may update the hyperparameters associated with the Gaussian process model, namely the parameters characterizing the kernel function K and the noise variance $\sigma_n^2$, by maximizing the likelihood of the observed KPIs. Both the acquisition function maximization and the hyperparameter update may use the solution of a non-convex problem that may be solved, for example, via quasi-Newton algorithms such as the Broyden-Fletcher-Goldfarb-Shanno (BFGS) algorithm, simpler gradient descent-based techniques, or gradient-free optimization techniques.

The set of new OLPC configuration parameters is transmitted 406 to the one or more base stations associated with the first cell cluster for example via operations administration and management (OAM) signalling.

The process illustrated in FIG. 4 may be iterative such that the process returns to block 402 after block 406 and continues from there.

Arbitrary clustering of cells may be supported. The C-SON server may define clusters of cells that share the substantially same OLPC parameters for example based on their proximity or load profiles. This may help to reduce the number of variables over which the optimization of a(x) is performed, which may lead to better convergence properties.

As an example of proximity-based clustering, the C-SON server may run a clustering algorithm, such as K-means, on the (x,y) coordinates of the base stations associated with the cells in order to aggregate different cells into a single cluster of cells, which shall share the substantially same OLPC parameters.

As an example of load-profile clustering, the C-SON server may run a clustering algorithm, such as K-means, on the load profile associated with each cell in order to aggregate different cells into a single cluster of cells, which shall share the substantially same OLPC parameters. Herein load profile may be defined as 1) the percentage of terminal devices at the cell edge, or 2) the average number of active terminal devices.

Figure 5:
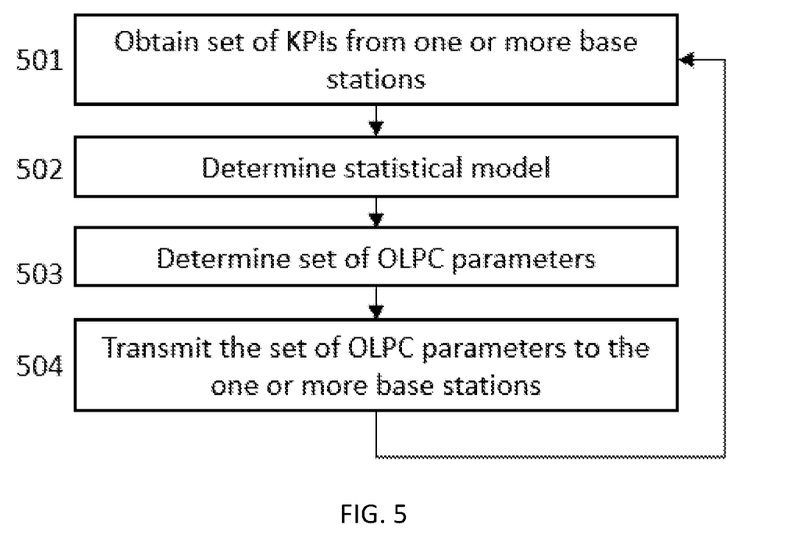

FIG. 5 illustrates a flow chart according to an exemplary embodiment. The procedures illustrated in FIG. 5 may be performed by an apparatus such as a C-SON server, for example. Referring to FIG. 5, a set of KPIs associated with a first set of OLPC parameters is obtained 501, or received, from one or more base stations. The first set of OLPC parameters may be currently or previously applied parameters at the one or more base stations, and the first set of OLPC parameters may be known by the apparatus, for example the C-SON server. A statistical model of the KPI function, for example SINR, to be optimized is determined 502 based at least partly on the set of KPIs and the first set of OLPC parameters. A second set of OLPC parameters is determined 503 based at least partly on the statistical model. For example, the second set of OLPC parameters may comprise a value for $P_{O\_NOMINAL\_PUSCH}$ and a value for α, wherein $P_{O\_NOMINAL\_PUSCH}$ defines the received power per PRB expected at the one or more base stations, and a defines the path loss compensation factor. The second set of OLPC parameters is transmitted 504 to the one or more base stations. The process illustrated in FIG. 5 may be iterative such that the process returns to block 501 after block 504 and continues from there.

Figure 6:
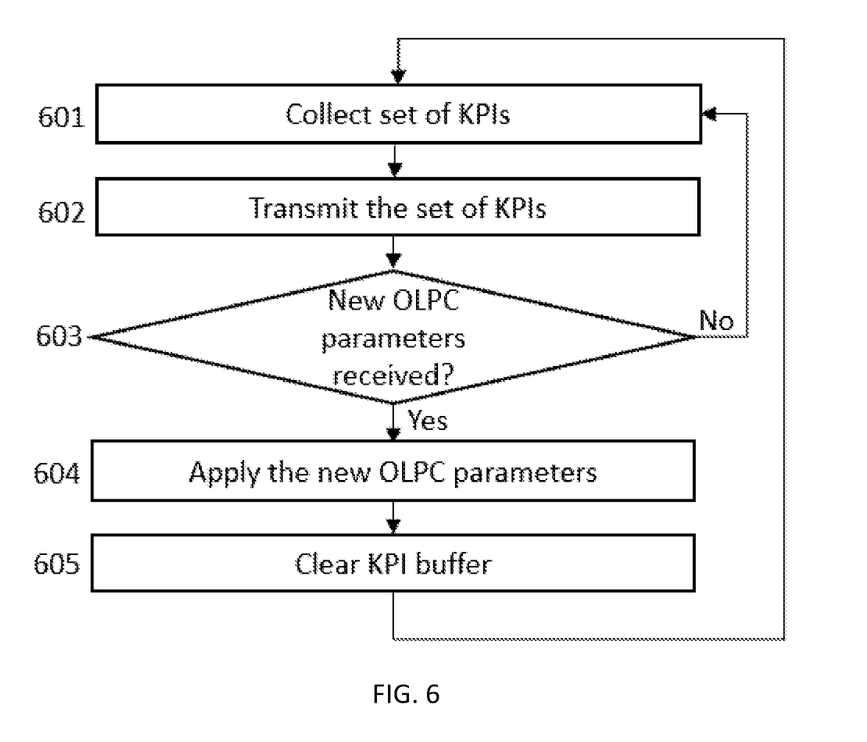

FIG. 6 illustrates a flow chart according to an exemplary embodiment. The procedures illustrated in FIG. 6 may be performed by an apparatus such as a base station. Referring to FIG. 6, a set of KPIs is collected 601 for example by performing measurements based on information received from one or more terminal devices. The set of KPIs is transmitted 602 to a second apparatus, for example to a C-SON server. It is then checked 603 if a set of new OLPC parameters have been received. If no new OLPC parameters have been received (603: no), the process returns to block 601. If new OLPC parameters have been received (603: yes), then the set of new OLPC parameters is applied 604, i.e. configured to be used by the base station, and the KPI buffer memory is cleared 605. The base station may use the set of new OLPC parameters to control the transmit power of one or more terminal devices. The process illustrated in FIG. 6 may be iterative such that the process returns to block 601 after block 605 and continues from there.

The functions and/or blocks described above by means of FIGS. 4-6 are in no absolute chronological order, and some of them may be performed simultaneously or in an order differing from the described one. Other functions and/or blocks may also be executed between them or within them.

A technical advantage provided by some exemplary embodiments may be that they may improve network performance by providing an improved OLPC parameter configuration in just a few iterations, for example less than 10 iterations. Some exemplary embodiments may prevent temporary performance losses caused by bad exploration choices in trial-and-error techniques, for example. Furthermore, the information learned on a different network deployment may be applied to another network deployment in order to avoid starting the optimization from scratch, when network conditions change. Some exemplary embodiments may also be able to adapt to evolving, or changing, network conditions for example in terms of cell load and/or proportion of terminal devices at the cell edge. Some exemplary embodiments may support arbitrary network-wide objective functions and cell-specific KPIs, and therefore these may be freely chosen by the mobile network operator.

Figure 7:
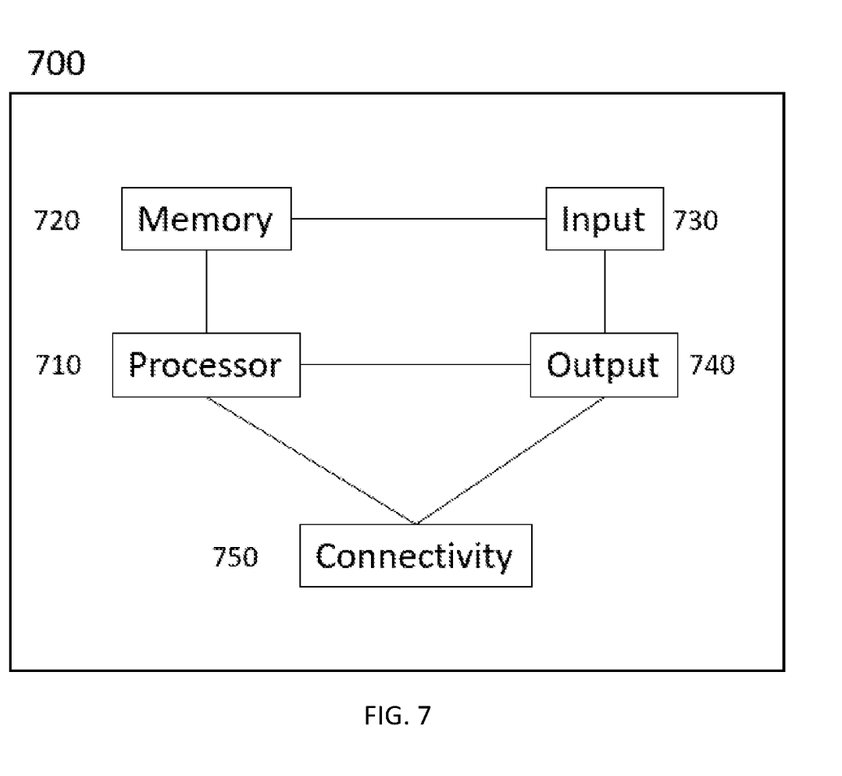
FIGS. 7 and 8 illustrate apparatuses according to some exemplary embodiments.

FIG. 7 illustrates an apparatus 700, which may be an apparatus such as, or comprised in, a C-SON server, according to an exemplary embodiment. The apparatus 700 comprises a processor 710. The processor 710 interprets computer program instructions and processes data. The processor 710 may comprise one or more programmable processors. The processor 710 may comprise programmable hardware with embedded firmware and may, alternatively or additionally, comprise one or more application specific integrated circuits, ASICs.

The processor 710 is coupled to a memory 720. The processor is configured to read and write data to and from the memory 720. The memory 720 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 720 stores computer readable instructions that are executed by the processor 710. For example, non-volatile memory stores the computer readable instructions and the processor 710 executes the instructions using volatile memory for temporary storage of data and/or instructions.

The computer readable instructions may have been pre-stored to the memory 720 or, alternatively or additionally, they may be received, by the apparatus, via an electromagnetic carrier signal and/or may be copied from a physical entity such as a computer program product. Execution of the computer readable instructions causes the apparatus 700 to perform one or more of the functionalities described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer.

The apparatus 700 may further comprise, or be connected to, an input unit 730. The input unit 730 may comprise one or more interfaces for receiving input. The one or more interfaces may comprise for example one or more buttons and/or one or more touch detection units. Further, the input unit 730 may comprise an interface to which external devices may connect to.

The apparatus 700 may also comprise an output unit 740. The output unit may comprise or be connected to one or more displays capable of rendering visual content such as a light emitting diode, LED, display, a liquid crystal display, LCD and a liquid crystal on silicon, LCoS, display.

The apparatus 700 further comprises a connectivity unit 750. The connectivity unit 750 enables connectivity to one or more external devices, such as base stations. The connectivity unit 750 may comprise an integrated circuit or a set of integrated circuits that provide the communication capability for the apparatus 700. Alternatively, the connectivity may be a hardwired application specific integrated circuit, ASIC.

It is to be noted that the apparatus 700 may further comprise various components not illustrated in FIG. 7. The various components may be hardware components and/or software components.

Figure 8:
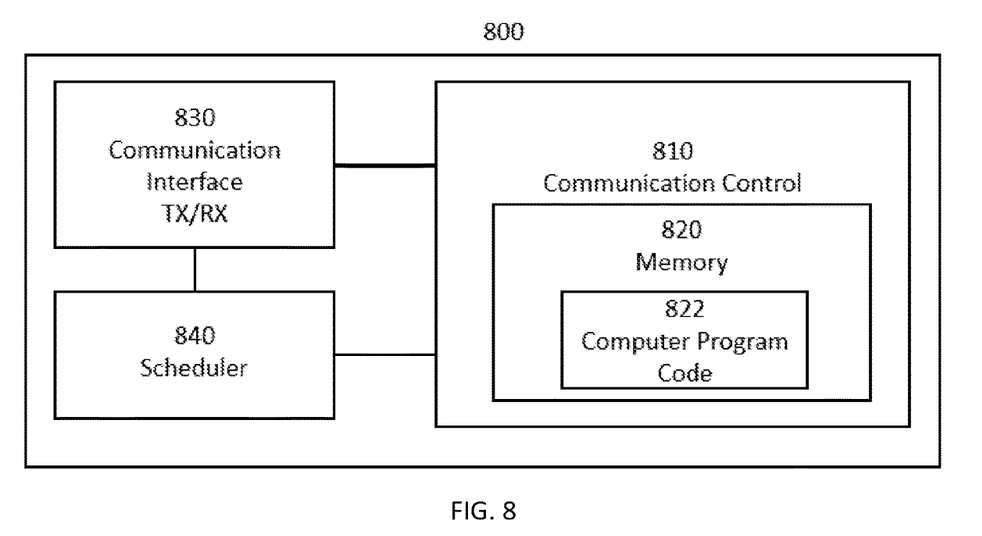

The apparatus 800 of FIG. 8 illustrates an exemplary embodiment of an apparatus such as, or comprised in, a base station such as a gNB. The apparatus may comprise, for example, a circuitry or a chipset applicable to a base station to realize some of the described exemplary embodiments. The apparatus 800 may be an electronic device comprising one or more electronic circuitries. The apparatus 800 may comprise a communication control circuitry 810 such as at least one processor, and at least one memory 820 including a computer program code (software) 822 wherein the at least one memory and the computer program code (software) 822 are configured, with the at least one processor, to cause the apparatus 800 to carry out some of the exemplary embodiments described above.

The memory 820 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data. For example, the configuration database may store a current neighbour cell list, and, in some exemplary embodiments, structures of the frames used in the detected neighbour cells.

The apparatus 800 may further comprise a communication interface 830 comprising hardware and/or software for realizing communication connectivity according to one or more communication protocols. The communication interface 830 may provide the apparatus with radio communication capabilities to communicate in the cellular communication system. The communication interface may, for example, provide a radio interface to terminal devices. The apparatus 800 may further comprise another interface towards a core network, a C-SON server, network coordinator apparatus and/or to the access nodes of the cellular communication system. The apparatus 800 may further comprise a scheduler 840 that is configured to allocate resources.

As used in this application, the term "circuitry" may refer to one or more or all of the following:
a. hardware-only circuit implementations (such as implementations in only analog and/or digital circuitry) and
b. combinations of hardware circuits and software, such as (as applicable):
 i. a combination of analog and/or digital hardware circuit(s) with software/firmware and
 ii. any portions of hardware processor(s) with software (including digital signal processor(s)), software, and memory(ies) that work together to cause an apparatus, such as a mobile phone, to perform various functions) and
c. hardware circuit(s) and or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. An apparatus comprising means for:
 obtaining, from one or more first base stations, a first set of key performance indicators associated with a first set of open loop power control parameters;
 determining a statistical model based at least partly on the first set of key performance indicators and the first set of open loop power control parameters;
 determining a second set of open loop power control parameters based at least partly on the statistical model;
 updating a set of hyperparameters associated with the statistical model by maximizing a likelihood of the first set of key performance indicators, wherein the set of hyperparameters define at least a kernel function and a noise variance associated with the statistical model;
 wherein the statistical model comprises a Gaussian process model.

2. An apparatus according to claim 1, wherein the apparatus further comprises means for transmitting the second set of open loop power control parameters to the one or more first base stations.

3. An apparatus according to claim 1, wherein the apparatus further comprises means for obtaining contextual information from the one or more first base stations, wherein the second set of open loop power control parameters is determined based at least partly on the contextual information.

4. An apparatus according to claim 3, wherein the contextual information comprises one or more of the following: a radio cell load, a hardware cell load, a backhaul cell load, a percentage of terminal devices at a cell edge, a satellite image, a two-dimensional map, a three-dimensional building model, a spatio-temporal distribution of the terminal devices, weather information, a date, a timestamp, and/or a random access channel failure rate.

5. An apparatus according to any claim 1, wherein the apparatus further comprises means for obtaining historical information indicating a relationship between one or more third sets of open loop power control parameters and one or more second sets of key performance indicators associated with one or more second base stations, wherein the statistical model is determined based at least partly on the historical information.

6. An apparatus according to claim 1, wherein the first set of key performance indicators comprises an average achieved throughput over a time window, an average signal-to-interference-plus-noise ratio associated with a plurality of terminal devices, and/or a number of lost packets.

7. An apparatus according to claim 1, wherein the second set of open loop power control parameters is determined by maximizing an acquisition function that is a function of a mean and a variance associated with the Gaussian process model.

8. An apparatus according to claim 1, wherein the second set of open loop power control parameters is determined by solving an optimization problem using at least the statistical model as input.

9. An apparatus according to claim 1, wherein the second set of open loop power control parameters is determined by using Bayesian optimization.

10. An apparatus according to claim 1, wherein the apparatus is comprised in a centralized self-organizing network server.

11. A method comprising:
obtaining, from one or more base stations, a first set of key performance indicators associated with a first set of open loop power control parameters;
determining a statistical model based at least partly on the first set of key performance indicators and the first set of open loop power control parameters;
determining a second set of open loop power control parameters based at least partly on the statistical model;
updating a set of hyperparameters associated with the statistical model by maximizing a likelihood of the first set of key performance indicators, wherein the set of hyperparameters define at least a kernel function and a noise variance associated with the statistical model;
wherein the statistical model comprises a Gaussian process model.

12. A non-transitory computer program comprising instructions for causing an apparatus to perform at least the following:
obtain, from one or more base stations, a first set of key performance indicators associated with a first set of open loop power control parameters;
determine a statistical model based at least partly on the first set of key performance indicators and the first set of open loop power control parameters;
determine a second set of open loop power control parameters based at least partly on the statistical model;
update a set of hyperparameters associated with the statistical model by maximizing a likelihood of the first set of key performance indicators, wherein the set of hyperparameters define at least a kernel function and a noise variance associated with the statistical model;
wherein the statistical model comprises a Gaussian process model.

13. A system comprising at least a first apparatus and one or more base stations:
wherein the one or more base stations are configured to:
collect a first set of key performance indicators associated with a first set of open loop power control parameters;
transmit the first set of key performance indicators to the first apparatus;
wherein the first apparatus is configured to:
receive the first set of key performance indicators from the one or more base stations;
determine a statistical model based at least partly on the first set of key performance indicators and the first set of open loop power control parameters;
determine a second set of open loop power control parameters based at least partly on the statistical model;
update a set of hyperparameters associated with the statistical model by maximizing a likelihood of the first set of key performance indicators, wherein the set of hyperparameters define at least a kernel function and a noise variance associated with the statistical model;
transmit the second set of open loop power control parameters to the one or more base stations;
wherein the one or more base stations are further configured to:
receive the second set of open loop power control parameters from the first apparatus; and
apply the second set of open loop power control parameters;
wherein the statistical model comprises a Gaussian process model.

* * * * *